(12) United States Patent
Ishibashi et al.

(10) Patent No.: US 7,583,399 B2
(45) Date of Patent: Sep. 1, 2009

(54) PRINTING DEVICE AND PRINT MANAGEMENT METHOD

(75) Inventors: Osamu Ishibashi, Nagano (JP); Ken Yoshizuka, Nagano (JP); Keiichi Taguchi, Nagano (JP); Hiroshi Tanaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 859 days.

(21) Appl. No.: 11/138,767

(22) Filed: May 27, 2005

(65) Prior Publication Data

US 2005/0286077 A1    Dec. 29, 2005

(30) Foreign Application Priority Data

May 27, 2004    (JP)    ............................. 2004-157368

(51) Int. Cl.
  *G06F 15/00*    (2006.01)
  *B41J 29/393*    (2006.01)
(52) U.S. Cl. ........................................ 358/1.15; 347/19
(58) Field of Classification Search ................. 358/1.15, 358/1.14, 1.16, 1.18, 1.1; 347/7, 19; 399/12, 399/13, 24, 79; 701/35, 200, 208, 210; 235/375, 235/385, 494
See application file for complete search history.

(56) References Cited

U.S. PATENT DOCUMENTS 6,158,837 A * 12/2000 Hilton et al. .................. 347/19

FOREIGN PATENT DOCUMENTS

| JP | 5-270111 A | 10/1993 |
|---|---|---|
| JP | 7-311670 A | 11/1995 |
| JP | 2003-316106 A | 11/2003 |

\* cited by examiner

*Primary Examiner*—Saeid Ebrahimi Dehkordy
(74) *Attorney, Agent, or Firm*—Sughrue Mion, PLLC

(57) ABSTRACT

The present invention provides a printing device whereby a recording agent cartridge that pertains to recording agent cartridge-related information can easily be identified. The printing device of the present invention stores cartridge identification information including user information on each user allocated to one of the multiple recording agent cartridges. When a print job with user identification information is received via the network (S10), the printing device identifies a recording agent cartridge corresponding to a user of the print job and sets the identified recording agent cartridge to an active recording agent cartridge for executing the print job (S20), based on the user identification information received with the print job and the user information. The printing device executes the print job and outputs output information with respect to a specified recording agent cartridge selected among the multiple recording agent cartridges, together with a specific piece of the cartridge identification information regarding the specified recording agent cartridge, which is selected out of the cartridge identification information stored in said cartridge identification information storage module (S30).

5 Claims, 6 Drawing Sheets

PRINTING DEVICE AND PRINT MANAGEMENT METHOD

BACKGROUND OF THE INVENTION

1. Field of the Invention

The present invention relates to a printing device and a print management method.

2. Description of the Related Art

A printing device has been proposed, for example, in JP A 5-270111 as this type of printing device in which an error causes printing to be cancelled and the error details and the appropriate response to be printed on the paper discharged by the printing device by the occurrence of the error. An electronic device is also proposed in JP A 7-311670 whereby an error, warning, or the like is detected, the state thus detected is displayed in a display input unit, and information relating to a procedure for addressing the state thus displayed is also displayed in the display input unit.

SUMMARY OF THE INVENTION

Errors that occur before or during printing must be made known to the user of the printing device. However, when the printing device is provided with multiple recording agent cartridges, and a user having advance usage permission is allocated to these recording cartridges, accurate error response becomes difficult to perform since no distinction is made in the printing device error output system as to which cartridge an error or the like pertains to, or which user's usage the error occurred during. Particularly when all of the recording agents retained in the multiple cartridges are black or otherwise the same color, a cartridge cannot be specified even when the color information of the recording agent retained in the cartridge is displayed.

An object of the present invention is to provide a printing device whereby the recording agent cartridge that pertains to information relating to the recording agent cartridge (hereinafter referred to as recording agent cartridge related information) can easily be distinguished when multiple recording agent cartridges is attached and a user is set for each of the multiple recording agent cartridges. An object of the present invention is also to provide a print management method whereby a recording agent cartridge pertaining to cartridge-related information can easily be distinguished in a case in which multiple recording agent cartridges is attached and a user is set for each of the multiple recording agent cartridges.

In order to achieve at least part of the objects described above, the printing device and the print management method of the present invention are constructed as follows. The present invention is directed to a printing device that is connected to a network and executes a print job with any of multiple recording agent cartridges attached thereto. The printing device includes: a cartridge identification information storage module that stores cartridge identification information with regard to the multiple recording agent cartridges, the cartridge identification information including user information on each user allocated to one of the multiple recording agent cartridges; an active recording agent cartridge setting module that, in response to acceptance of a print job with user identification information received from a certain user via the network, identifies a recording agent cartridge, which is allocated to the certain user and is to be used for execution of the accepted print job, based on the user identification information received with the accepted print job and the user information stored in the cartridge identification information storage module, and sets the identified recording agent cartridge to an active recording agent cartridge; a print job execution module that executes the accepted print job with the active recording agent cartridge; and an information output module that outputs a specific piece of output information with respect to a specified recording agent cartridge selected among the multiple recording agent cartridges, together with a specific piece of the cartridge identification information regarding the specified recording agent cartridge, which is selected out of the cartridge identification information stored in the cartridge identification information storage module.

In this printing device, various types of cartridge identification information including user information on each user allocated to one of the multiple recording agent cartridges are stored with respect to the multiple recording agent cartridges attached thereto. When a print job is received from one of a user, the printing device set a recording agent cartridge that corresponds to the user to the active recording agent, and executes printing with the active recording agent cartridge. The printing device then outputs a specific piece of output information with respect to a specified recording agent cartridge together with a specific piece of the cartridge identification information regarding the specified recording agent cartridge. Since the output information thus obtained is accompanied by the cartridge identification information, it can easily be determined which of the multiple recording agent cartridges pertains to the output information, thus ensuring appropriate response based on the output information.

In the printing device of the invention, the output information may regard a remaining quantity of a recording agent in the specified recording agent cartridge. This ensures specifying the remaining quantity in each of the multiple recording agent cartridges. The output information may regard an error status arising during execution of a print job with the specified recording agent cartridge. This ensures an accurate and rapid response to errors occurred during execution of a print job.

The printing device of the invention may further include a detection module that detects an error status arising during execution of the accepted print job with the active recording agent cartridge, based on a result of a predetermined test with regard to the active recording agent cartridge. In this case, the information output module may output the specific piece of output information with respect to the active recording agent cartridge, in response to detection of an error status by the detection module. This ensures outputting information on the cartridge, according to status of the error.

In the printing device of the invention, the specific piece of the cartridge identification information output together with the specific piece of output information may be a user name. This ensures prompt recognition of the cartridge and the user of the print job.

The present invention is also directed to a print management method that manages printing with a printing device which is connected to a network and executes a print job with any of multiple recording agent cartridges attached thereto. The print management method includes the steps of: in response to acceptance of a print job with user identification information received from a certain user via the network, identifying a recording agent cartridge, which is allocated to the certain user and is to be used for execution of the accepted print job, based on the user identification information received with the accepted print job and user-related information on each user allocated to one of the multiple recording agent cartridges attached to the printing device, and setting the identified recording agent cartridge to an active recording agent cartridge; executing the accepted print job with the active recording agent cartridge; and outputting a specific piece of output information with respect to a specified recording agent cartridge selected among the multiple recording agent cartridges, together with a specific piece of the user-related information on a user allocated to the specified recording agent cartridge. The print management method sets a recording agent cartridge that corresponds to the user is set to the active recording agent, and executes printing with the active recording agent cartridge. The print management method then outputs a specific piece of output information with respect to a specified recording agent cartridge together with a specific piece of the cartridge identification information regarding the specified recording agent cartridge. Since the output information thus obtained is accompanied by the cartridge identification information, it can easily be determined which of the multiple recording agent cartridges pertains to the output information, thus ensuring appropriate response based on the output information.

DESCRIPTION OF THE PREFERRED EMBODIMENTS

Figure 1:
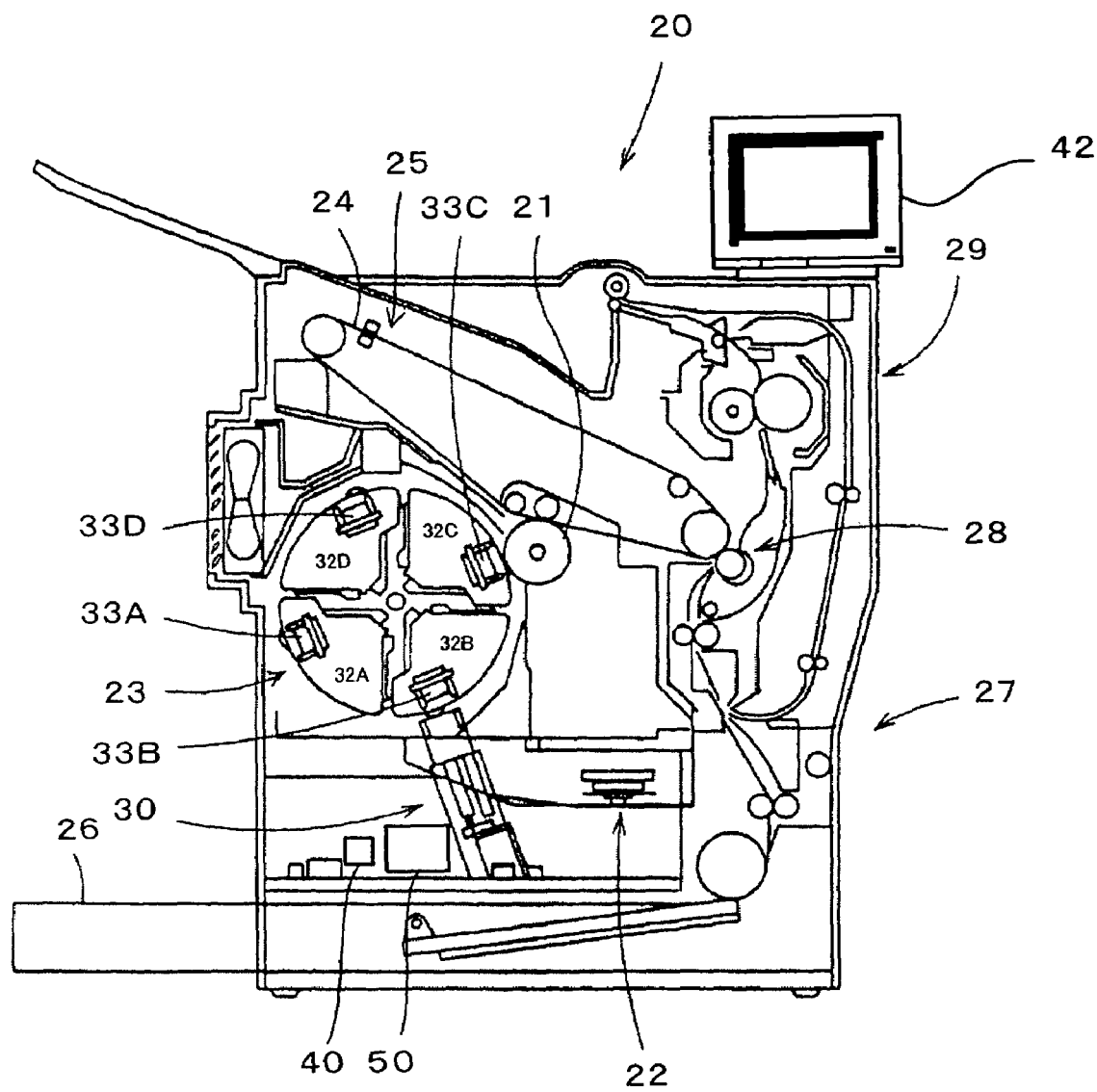
FIG. 1 schematically illustrates a printing device 20 of a first embodiment of the present invention.
Figure 2:
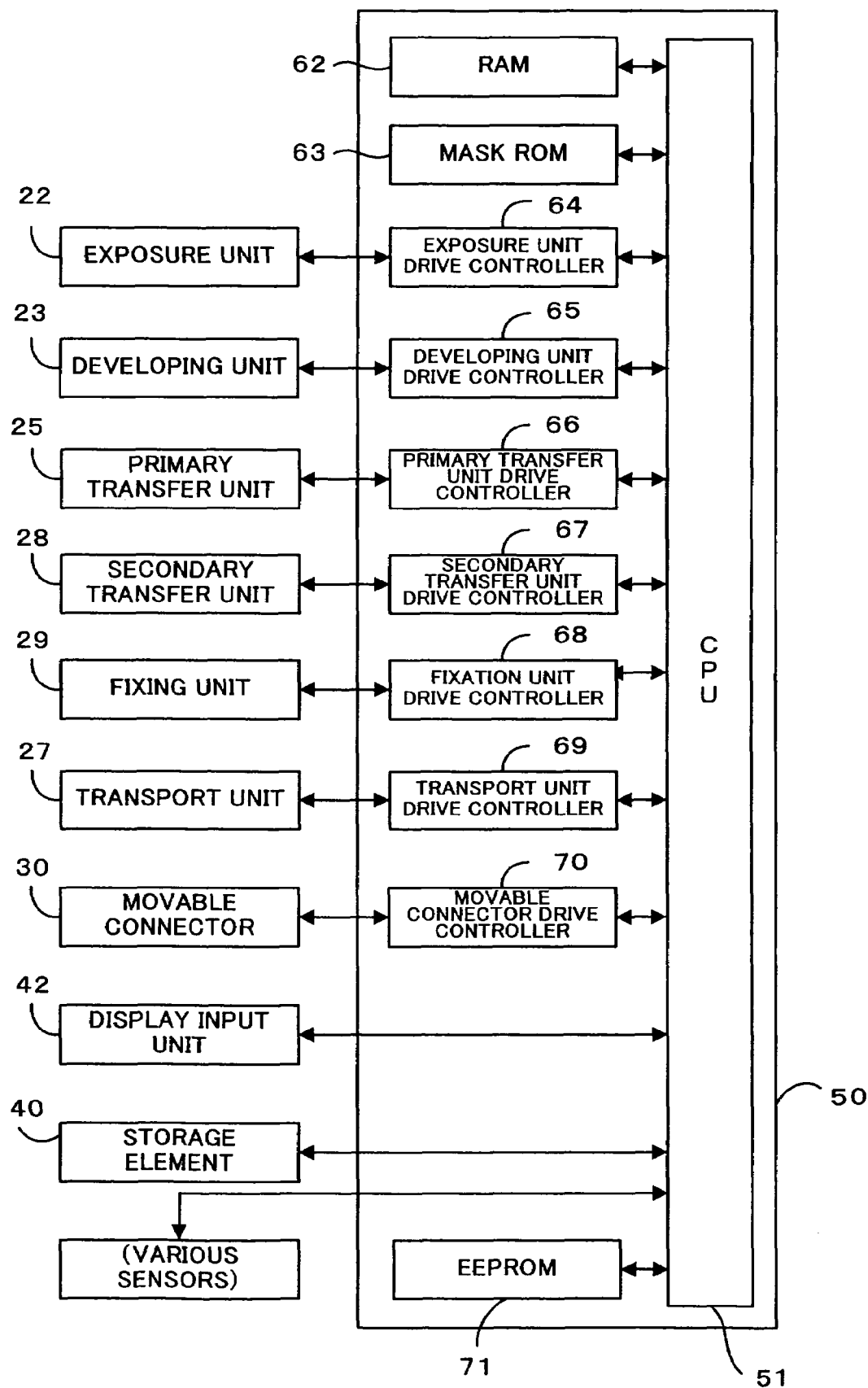
FIG. 2 is a block diagram showing a controller 50.
Figure 3:
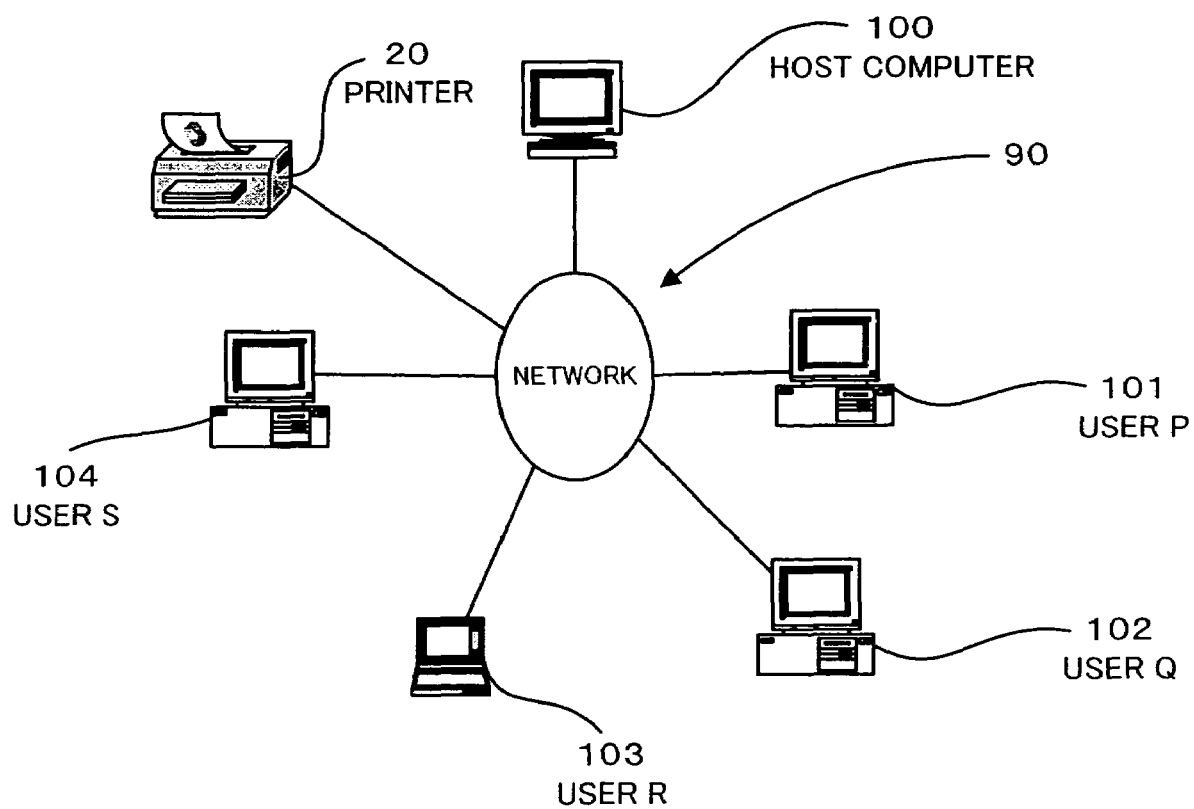
FIG. 3 is a diagram showing the entire network that includes the printing device 20.

Preferred embodiments for implementing the present invention will next be described using examples. FIG. 1 is a structural diagram showing an overview of the structure of the printing device 20 according to a first embodiment of the present invention; and FIG. 2 is a block diagram showing the input and output of the control signal in the controller 50 of the printing device 20 of the embodiment. FIG. 3 is a diagram showing the entire network that includes the printing device 20.

The printing device 20 of the present embodiment is a monochrome laser printer. This printing device 20 is configured as a monochrome electrographic printing device that employs a single-photoreceptor system and an intermediate transfer system, and is provided with an exposure unit 22 for forming an electrostatic latent image of the image to be printed by emitting laser light onto a charged photoreceptor 21; a total of four toner cartridges 32A, 32B, 32C, and 32D (hereinafter indicated as 32A through 32D) all containing black toner; a developing unit 23 for developing the electrostatic latent image formed on the photoreceptor 21 as a toner image by using the black toner fed from the toner cartridges 32A through 32D; a primary transfer unit 25 for superposing and transferring the toner image thus developed on the photoreceptor 21 onto a transfer belt 24 and forming a color toner image; a transport unit 27 for transporting paper stock from a paper stock cassette 26; a secondary transfer unit 28 for transferring the color toner image formed on the transfer belt 24 to the paper stock thus transported; a fixing unit 29 for fusing the color toner image transferred onto the paper stock to the paper stock and discharging the paper; a movable connector 30 for forming a connection with storage elements 33A, 33B, 33C, and 33D (hereinafter indicated as 33A through 33D) attached to the toner cartridges 32A through 32D during the rotation of the developing unit 23 and reading the information relating to a user assigned to each toner cartridge and other cartridge identification information in conjunction with the rotation of the developing unit 23; a storage element 40 for storing various types of breakdown history relating to the toner cartridges; a display input unit 42 for displaying various types of information relating to the printing device 20; and a controller 50 for controlling the operation of the entire printing device 20 thus configured, as shown in FIG. 1. The printing device 20 is also provided with a counter not shown in the drawing for counting the number of prints on various sizes of media. In this example, a description is given of a printing device that employs a single-photoreceptor system and an intermediate transfer system, but a tandem system having a photoreceptor and developing unit for each toner cartridge, or other configuration may also be adopted.

The storage elements 33A through 33D attached to the toner cartridges 32A through 32D, respectively, store identification information for identifying their respective toner cartridges 32A through 32D. The cartridge identification information includes information concerning the quality of the toner retained in the toner cartridge, the quality expiration date, and other attributes whereby the cartridges can be identified, and user information relating to the users, such as usernames assigned so as to grant permission to use the cartridges, user identification information, and the like, with respect to each of the toner cartridges 32A through 32D. Such storage elements 33A through 33D may be provided so as to be attached in advance or capable of being attached to the toner cartridges 32A through 32D as CSIC (Customer Specific Integrated Circuit) chips or the like.

The storage element 40 stores the cartridge identification information of the toner cartridges 32A through 32D that is read via the movable connector 30. The storage element 40 stores information about the quantity of toner remaining in the toner cartridges 32A through 32D, a history of the occurrence of paper jams and other malfunctions, information about the users of the toner cartridges 32A through 32D and the amounts of toner consumed by the users (toner quantities, the number of sheets printed, and the like), the number of sheets printed by each cartridge, and other cartridge usage information that includes the usage history of each cartridge. The storage element 40 is provided with a memory cell for storing these items of cartridge identification information and cartridge usage information, and a read/write controller for controlling the reading and writing of data in the memory cell.

The display input unit 42 of the printing device 20 is configured so that information that specifies a malfunctioning cartridge is displayed together with the malfunction conditions of the toner cartridges 32A through 32D attached to the printing device 20.

As shown in FIG. 2, the controller 50 is composed of a microprocessor centered on a CPU 51, RAM 62, mask ROM 63, and EEPROM 71. Various types of input signals and input signals from various types of sensors are input thereto via signal lines, and the controller controls the operation of the exposure unit 22 or developing unit 23, the primary transfer unit 25, the secondary transfer unit 28, the fixing unit 29, the transport unit 27, the movable connector 30, the display input unit 42, and other components of the printing device 20 on the basis of these input signals via the exposure unit drive controller 64, the development unit drive controller 65, the primary transfer unit drive controller 66, the secondary transfer unit drive controller 67, the fixing unit drive controller 68, the transport unit drive controller 69, the movable connector drive controller 70, and other components, and controls writing of cartridge identification information from the storage elements 33A through 33D attached to the toner cartridges 32A through 32D to the storage element 40 and reading of the cartridge identification information from the storage element 40.

Test items for testing the status of the toner cartridges 32A through 32D are stored in the mask ROM 63. The test items are not particularly limited, and examples thereof include the remaining quantity of recording agent, the quality expiration date of the recording agent in the cartridges, the presence of a paper jam, and the like. The mask ROM 63 also stores a program for outputting the information obtained from testing the toner cartridges 32A through 32D with regard to these test items as output information relating to any of the toner cartridges 32A through 32D, along with the cartridge identification information stored in the storage element 40.

The mask ROM 63 also stores a program that, when a print job with a user identification information is received, determines a recording agent cartridge that corresponds to a user of the received print job, based on the user identification information received with the accepted print job and the user information stored in the storage element 40, and sets the recording agent cartridge as an active recording agent cartridge.

As shown in FIG. 3, the printing device 20 thus configured is connected to a LAN (Local Area Network) or other network 90, and is configured so as to be capable of data exchange with a host computer 100 or client computers 101, 102, 103, and 104. The toner cartridges 32A through 32D of this printing device 20 are assigned to multiple users P, Q, R, and S, respectively, via the multiple client computers 101, 102, 103, and 104. For example, a user of the toner cartridge 32A may be set to be user P via user information by the name or user identification information of user P being stored in advance as a user in the storage element 33A.

The printing procedure performed when a print job from user P is received will next be described based on FIGS. 4 and 5.

Figure 4:
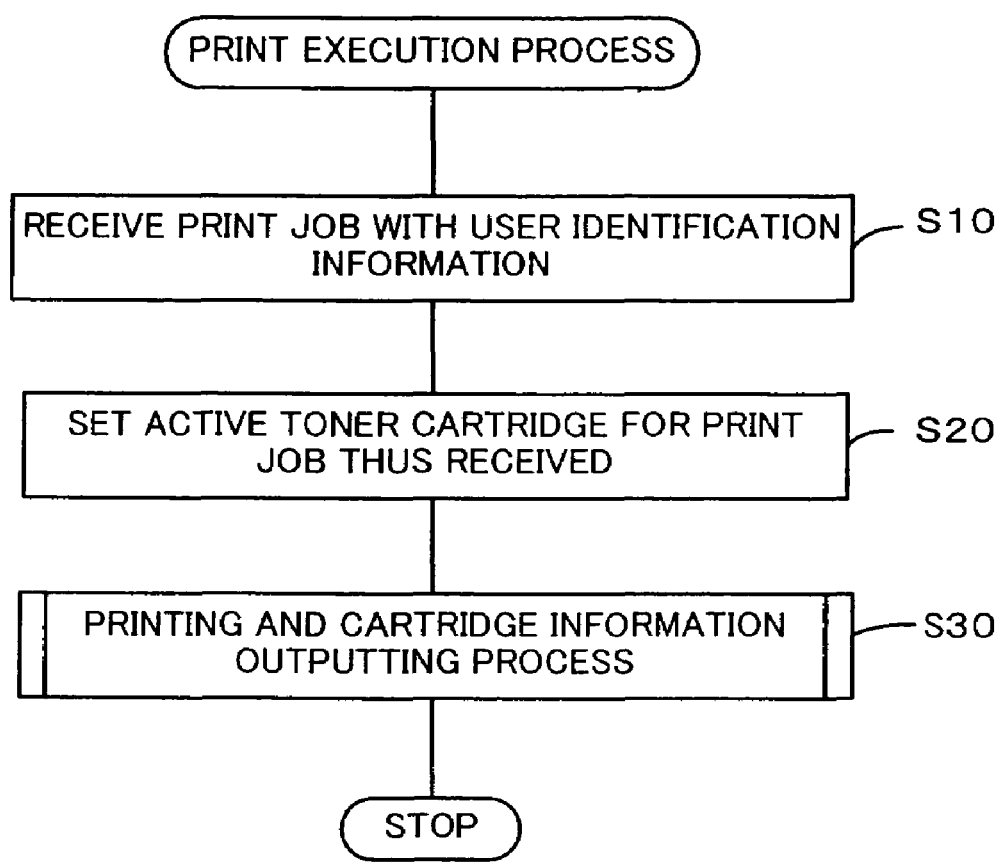
FIG. 4 is a flowchart showing an example of print execution processing.
Figure 5:
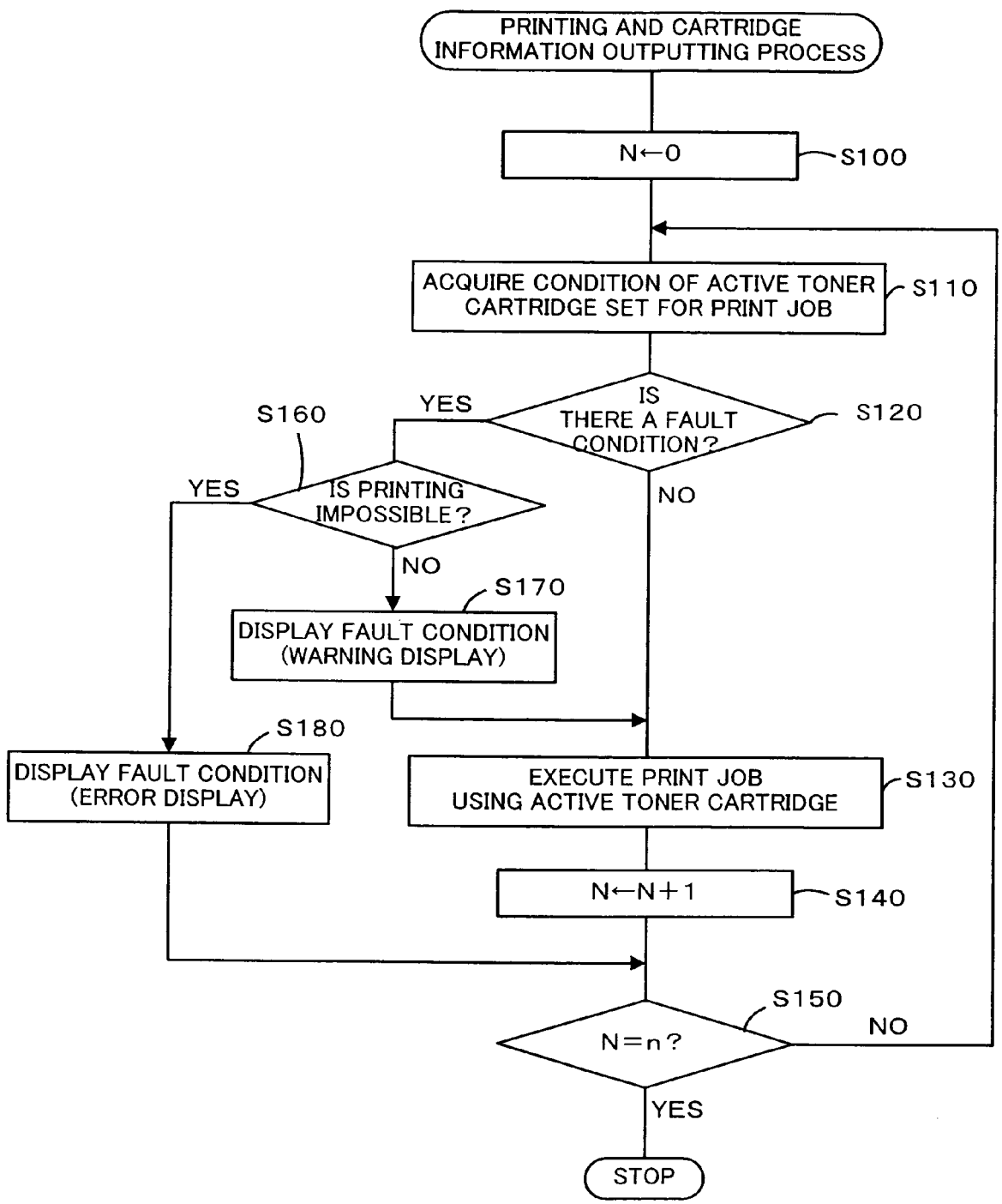
FIG. 5 is a flowchart showing an example of printing and cartridge information output processing.

FIG. 4 is a flowchart showing an example of the print execution process executed by the controller 50 in the printing device 20; and FIG. 4 is a flowchart showing an example of the printing and cartridge information output step (step S30) in the print execution process. The print execution process is a routine for executing a job and outputting information (cartridge information) on the toner cartridge used in executing the print job.

In the print execution process as shown in FIG. 4, the procedure first receives a print job with user identification information from user P that has been input via the network 90 (step S10). After the print job is received, the procedure identifies a toner cartridge that corresponds to the user identification information accompanying the received print job (step S20). In this step, the procedure references the user identification information accompanying the print job thus received with user identification information included in the user information stored in the storage element 40, identifies one toner cartridge assigned in advance to the user pertaining to the user identification information thus received, and sets the toner cartridge 32A thus identified as an active toner cartridge for printing the job.

The procedure then executes printing the job and outputs the cartridge information (step S30). As shown in FIG. 5, the procedure prints the job, tests the condition of the toner cartridge 32A used for each printed page, and displays the condition according to the potential for impairment on the display input unit 42 along with cartridge identification information (name of user P is used in this case) that allows the toner cartridge 32A to be distinguished. Specifically, the procedure sets the initial value 0 to the value N of a counter, which is provided for counting printed pages in a print job based on the contents of the print job (step S100). The username may be the name of a user, a division name, an abbreviated name, a term of address, or other name whereby the user can be identified. The username may also be composed of letters, numbers, symbols, or a combination thereof, or graphics or a combination of letters and the like with graphics.

The procedure then acquires the condition of the toner cartridge 32A set as the active toner cartridge for printing the job (step S110). The CPU 51 perform this step by acquiring test results for a prescribed test item set in advance for the toner cartridge. Acquisition of the test results for the prescribed test item may be performed, for example, by reading the condition test item to be tested by the CPU 51 from the mask ROM 63, transmitting a detection signal to various types of sensors for that item, and outputting information relating to the operating condition (paper jamming, for example) of the toner cartridge to the CPU 51, or by reading the remaining quantity of toner, the quality expiration date, and other usage information stored in the storage element 40.

The procedure then determines whether the test results thus acquired indicate a condition that has at least a certain potential for impairment (hereinafter referred to as fault condition) (step S120). The procedure determines from the test results obtained for each condition test item whether the operating condition in that area has reached a predetermined fault condition for each item stored in advance in the mask ROM 63; for example, whether the remaining quantity of toner in the toner cartridge is at or below a prescribed value, whether a certain time period has passed before the toner quality expiration date, whether a paper jam has occurred, and other conditions.

When it is determined in the determination step (step S120) that no fault conditions exist in the obtained test results for all of the test items, the print job for the first page is executed using the toner cartridge 32A set as the active toner cartridge (step S130). After a numerical value of 1 is added to the value N of the counter (step S140), the procedure determines whether the value N of the counter matches the total number of pages n to be printed in the print job (step S150). When this value does not match the total number of pages, the process returns to the step for acquiring the condition of the toner cartridge for the print job of the second page (step S110). The print job is thus sequentially executed for each page of the print job and cartridge information is output (step S30). If no printing failure occurs during the procedure, all of the pages of the print job are printed, and the printing procedure is completed. Accordingly, when it is determined that no fault conditions exist in all of the test items for all pages in the print job, no fault condition is output.

When it is determined, on the other hand, that any fault condition exist in the test results in step 120, and it is determined that in step 160 that the existing fault condition is not on a level sufficient to cause an inability to execute printing, the procedure displays a warning display including the fault condition and the name of the user P of the toner cartridge 32A on the display input unit 42 (step S170), and print the first page of the print job (step S130). When it is determined in the determining step (step 160) that the existing fault is on a level to cause an inability to execute printing, for example, when the remaining quantity of toner as one of the test items is too low to execute the printing, or when there is a paper jam, the procedure displays an error display including the fault condition and the name of user P on the display input unit 42 (step S180), carries out the matching with the total number of pages n (step S150), and returns to the condition acquisition step (step S110). The job is printed at least on condition that the fault condition is removed to the extent that printing can be performed. When the user P cancels the print job, the print execution process is cancelled and printing and the cartridge information outputting process (step S30) is terminated.

In the printing device 20 of the embodiment described above, when the quantity of toner in a toner cartridge as the active toner cartridge falls to or below a specified quantity, or a paper jam occurs, or another fault condition relating to a toner cartridge as the active toner cartridge occurs during execution of a print job, the name and other information related to a user of the toner cartridge in which the fault condition has occurred is displayed together with the fault information on the display input unit 42. It can therefore be reliably determined which of the multiple toner cartridges included in the printing device the fault condition has occurred in, and which user's print job the fault condition has occurred during, even when the printing device is used in a state in which multiple users are assigned to multiple toner cartridges respectively. Specifically, the location in which the fault has occurred and the user who is the person printing the job can easily be specified, and the cause of the fault can be rapidly eliminated in order to remove the cause of the fault condition. As a result, the printing device 20 allows for accurate and efficient response to the occurrence of a fault condition.

In the printing device 20, one cartridge can be easily specified based on not the difference of toner color but other pieces included in the cartridge identification information, even when toner color can not be used to specify one toner cartridge, for example, when the multiple toner cartridges 32A through 32D share the same toner color. This is particularly advantageous when all of the toner is black.

In this printing device 20, the result for a prescribed test item is acquired for the active toner cartridge, which is used for executing the print job. The degree of potential for failure (including whether failure has occurred) during usage is determined based on the acquired result, and the fault condition is output according to the determined degree during printing of the job. The degree of the failure can therefore be accurately communicated to the user who has sent the print job.

In the printing device 20, the storage element 40 in FIG. 1 corresponds to the cartridge identification information storage module of the present invention; the CPU 51 for executing step S20 in FIG. 4 corresponds to the active recording agent cartridge setting module of the present invention; and the CPU 51 for executing step S30 in FIG. 4, the exposure unit 22, the developing unit 23, the primary transfer unit 25, the secondary transfer unit 28, the fixing unit 29, and the transport unit 27 correspond to the print job execution module and the information output module of the invention. The toner cartridges in the printing device 20 correspond to the multiple recording agent cartridges of the invention; and the information (cartridge-related information) about the operating condition and the like of the cartridges in the abovementioned description corresponds to the output information with respect to any of the recording agent cartridges of the present invention. Furthermore, the CPU 51 which executes step S110 for acquiring the condition of the toner cartridge for printing the job, and step S120 for determining whether the test results thus acquired show a condition (hereinafter referred to as fault condition) having a fault potential of a certain level or higher corresponds to the detection module of the present invention.

In the above embodiment, the printing device 20 outputs cartridge-related information along with a print job when fault potential of a certain level or higher had occurred in a cartridge. The printing device 20 may output and display a test result along with user information and other cartridge identification information on the display input unit 42 even when fault potential of a certain level or higher does not exist and the print job can be executed normally. For example, a test result, and cartridge identification information that includes the information of the user who is using the cartridge, can also be displayed on the display input unit when the remaining quantity of toner or paper stock is satisfactory. In this way, other user who is not the user of the print job can track and confirm the cartridge being used, and the user of the print job, and the current status of a cartridge.

Figure 6:
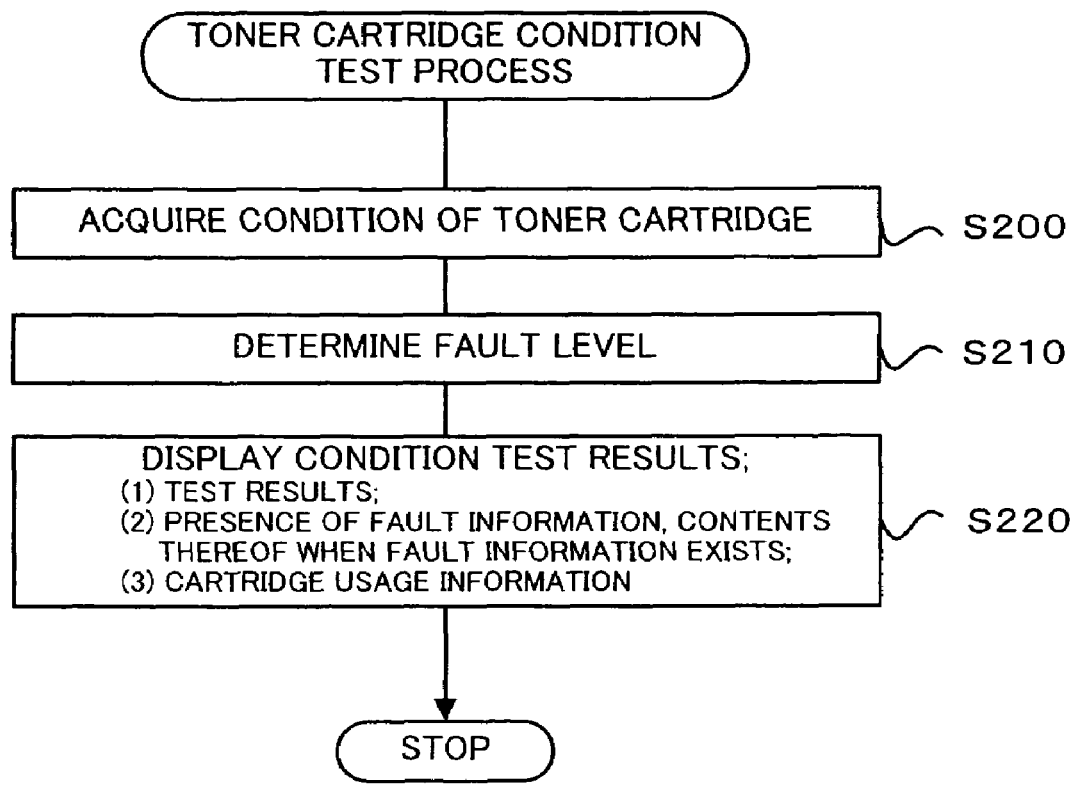
FIG. 6 is a flowchart showing an example of a toner cartridge condition test process.

In the printing device 20, cartridge-related information and cartridge identification information are output during execution of a print job. In one modified structure, these items of information may also be output independently from execution of a print job. For example, the toner cartridge condition test process shown in FIG. 6 is performed at regular time intervals in the printing device 20, to acquire condition of a toner cartridge (step S200), determine the level of fault potential (step S210), and display the test results on the display input unit 42 (step S220). In this way, an error or warning related to a fault condition can be displayed together with user information and other cartridge identification information in a timely manner when the fault condition occurs in the toner cartridge. In another modified structure, the cartridge-related information and the cartridge identification information may be displayed on the display input unit 42 when a request for output of the cartridge-related information from a user is received via the display input unit 42 of the printing device 20 or the network 90. In the printing device 20, the cartridge-related information and the cartridge identification information are output to the display input unit 42. This information may also be output to the host computer 100 of a network via the network 90, or may be output to a client computer 101 or the like, for example.

The cartridge-related information output by the printing device 20 may include the quality expiration date of a cartridge, the scheduled replacement date of a cartridge, and other information pertaining to cartridge maintenance, in addition to the cartridge usage history and other types of usage information described above. By displaying such maintenance information together as the cartridge identification information, maintenance can be accurately performed for each cartridge even when a different user is assigned to each of multiple cartridges. The scheduled replacement date for a cartridge can be computed, for example, from the toner consumption rate of each cartridge stored in the storage element 40.

The cartridge usage history and other types of usage information in the cartridge-related information may include information about whether a toner cartridge is used by a user other than the pre-assigned user, usage history by the user other than the pre-assigned user, such as the quantity of the toner used. When use of a cartridge is allowed under certain conditions for a user other than the pre-assigned user, outputting such usage information with the cartridge-related information is effective. When a use of a cartridge is allowed only for a pre-assigned user, usage history may also be a type of fault information in the cartridge, and the user can appropriately respond to an unexpected toner consumption and other maintenance concerns. For example, when usage of the toner cartridge 32A by a user Q other than user P is allowed under certain conditions, the usage history of the toner cartridge 32A by user Q, such as times the cartridge is used by user Q and the quantity of toner used by user Q may be output with the usage history by user P, as the cartridge-related information and displayed with the cartridge identification information.

The printing device 20 of the above embodiment is described as a color laser printer, but is not limited to this configuration alone. The technique may also be applied in an inkjet printer or other form of printer, or in a copying device, facsimile device, or the like. In the above embodiment, the CPU 51 was provided with EEPROM 71, but EPROM may also be used instead of EEPROM. A storage element 40 was also used in the printing device 20, but the EEPROM 71 in the controller 50 may also be used instead of the storage element 40. The technique of the present invention is applicable not only to the printing device 20 in the above embodiment, but also a print management method.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The disclosure of Japanese Patent Application No. 2004-157368 filed on May 27, 2004 including specification, drawings, and claims is incorporated herein by reference in its entirety.

What is claimed is:

1. A printing device that is connected to a network and executes a print job with any of multiple recording agent cartridges attached thereto, said printing device comprising:
    a cartridge identification information storage module that stores cartridge identification information with regard to the multiple recording agent cartridges, the cartridge identification information including user information on each user allocated to one of the multiple recording agent cartridges;
    an active recording agent cartridge setting module that, in response to acceptance of a print job with user identification information received from a certain user via the network, identifies a recording agent cartridge, which is allocated to the certain user and is to be used for execution of the accepted print job, based on the user identification information received with the accepted print job and the user information stored in said cartridge identification information storage module, and sets the identified recording agent cartridge to an active recording agent cartridge;
    a print job execution module that executes the accepted print job with the active recording agent cartridge; and
    an information output module that outputs a specific piece of output information with respect to a specified recording agent cartridge selected among the multiple recording agent cartridges, together with a specific piece of the cartridge identification information regarding the specified recording agent cartridge, which is selected out of the cartridge identification information stored in said cartridge identification information storage module.

2. A printing device in accordance with claim 1, wherein the output information regards a remaining quantity of a recording agent in the specified recording agent cartridge.

3. A printing device in accordance with claim 1, wherein the output information regards an error status arising during execution of a print job with the specified recording agent cartridge.

4. A printing device in accordance with claim 1, said printing device further comprising:
    a detection module that detects an error status arising during execution of the accepted print job with the active recording agent cartridge, based on a result of a predetermined test with regard to the active recording agent cartridge,
    wherein said information output module outputs the specific piece of output information with respect to the active recording agent cartridge, in response to detection of an error status by said detection module.

5. A printing device in accordance with claim 1, wherein the specific piece of the cartridge identification information output together with the specific piece of output information represents a user name.

* * * * *